United States Patent [19]
Lemley

[11] 3,834,215
[45] Sept. 10, 1974

[54] PORTABLE HYDRAULIC STRIP SEALER AND CUTTER

[75] Inventor: Luther H. Lemley, Lafayette, Ind.

[73] Assignee: Willen Corporation, Rushville, Ind.

[22] Filed: Nov. 24, 1972

[21] Appl. No.: 309,166

[52] U.S. Cl............ 72/410, 30/180, 30/228, 30/258, 72/412, 72/453, 81/301
[51] Int. Cl............................................. B21d 43/28
[58] Field of Search............ 72/409, 410, 412, 453; 30/180, 228, 258; 81/301; 7/14.1, 5.4, 5.5

[56] References Cited
UNITED STATES PATENTS

| 959,245 | 5/1910 | Millington | 30/258 |
|---|---|---|---|
| 1,431,421 | 10/1922 | Prince | 7/5.4 |
| 2,274,945 | 3/1942 | Van Keuren | 30/258 |
| 2,823,454 | 2/1958 | Kirchner | 30/228 |
| 2,990,613 | 4/1961 | Keane | 30/180 |
| 3,005,366 | 10/1961 | Grimshaw | 7/5.5 |
| 3,058,214 | 10/1962 | Mekler | 30/180 |
| 3,111,870 | 11/1963 | Anderson | 81/301 |
| 3,172,133 | 3/1965 | Rizzo | 7/5.4 |
| 3,177,583 | 4/1965 | Fischer | 30/180 |

FOREIGN PATENTS OR APPLICATIONS

| 1,184,470 | 3/1970 | Great Britain | 30/180 |

*Primary Examiner*—Charles W. Lanham
*Assistant Examiner*—Gene P. Crosby
*Attorney, Agent, or Firm*—Woodward, Weikart, Emhardt & Naughton

[57] ABSTRACT

A hydraulically operated tool operable to cut a steel strip and also operable to crimp a seal on the strip. A top blade is pivotally mounted to a bottom block with the cutting edge of the blade received by a groove in the top surface of the block. A second groove extends across the block for receiving and holding the strip during cutting. The distal ends of the blade and block have mating flat surfaces which are forced together to crimp a seal on the strip. In one embodiment, a pair of hydraulic cylinders are mounted to the block and are operable by a pair of handles to close the blade with respect to the block. In another embodiment, one hydraulic cylinder is mounted to the block whereas the second hydraulic cylinder is separate from the blade and block but is connected to the first hydraulic cylinder by a high pressure conduit.

10 Claims, 6 Drawing Figures

PATENTED SEP 10 1974 3,834,215

PORTABLE HYDRAULIC STRIP SEALER AND CUTTER

BACKGROUND OF THE INVENTION

1. Field of the Invention

This invention is in the field of hydraulic cutter and sealers.

2. Description of the Prior Art

A number of patents have been granted for various cutters which are provided with a large mechanical advantage allowing the operator to cut relatively strong objects such as bolts. A representative sample of these cutters are disclosed in the following U.S. Pat. Nos:

1,019,689 issued to A. Nelson:
1,882,790 issued to J. J. Eyre et al;
2,744,321 issued to D. H. Keiser, Jr.;
2,939,211 issued to A. G. Daniels; and
3,138,869 issued to O. E. Parhaniemi.

In order to increase the mechanical advantage of a cutter, hydraulic means may be utilized to close together the cutting edges in lieu of various gears, linkages and other mechanical means. It is, therefore, known to provide a hydraulically operated cutter.

A major problem in the railroad industry exists due to the large value of products taken from railroad cars by theft. A railroad car is provided with a slidable door which is locked in place. It is possible to reduce the probabilities of theft by increasing the strength of the lock used on the railroad car. For example, a strong steel strip may be inserted through the lock with the opposite ends then crimped together or sealed together. By increasing the strength of the steel strip, the regular unloader of the box car is then at a disadvantage since the strip is sufficiently strong so as to prevent easy cutting thereof. Disclosed herein is a hydraulically operated tool which allows the unloader to easily cut the steel strip. In addition, the tool is provided with means for sealing or crimping the opposite ends of the strip when the railroad car is first sealed.

SUMMARY OF THE INVENTION

One embodiment of the present invention is in a fluid operated tool for severing s strip and for crimping a seal, the tool including a lower member having an upper surface and an outer distal end, a top blade hingedly mounted to the lower member and having a cutting edge and an outer distal end, means mounted to the top blade and the lower member operable to move the cutting edge against the top surface of the lower member wherein the improvement comprises the distal end of the lower member has a flat top surface and the distal end of the top blade has a flat bottom surface of greater width than the cutting edge, the means is operable to force the flat bottom surface against the flat top surface for crimping the seal and is operable to move the cutting edge against the upper surface for severing the strip.

It is an object of the present invention to provide a fluid operated tool for severing a strip and for crimping a seal.

It is a further object of the present invention to provide a new and improved hydraulic cutter.

Related objects and advantages of the present invention will be apparent from the following description.

DESCRIPTION OF THE PREFERRED EMBODIMENTS

Figure 1:
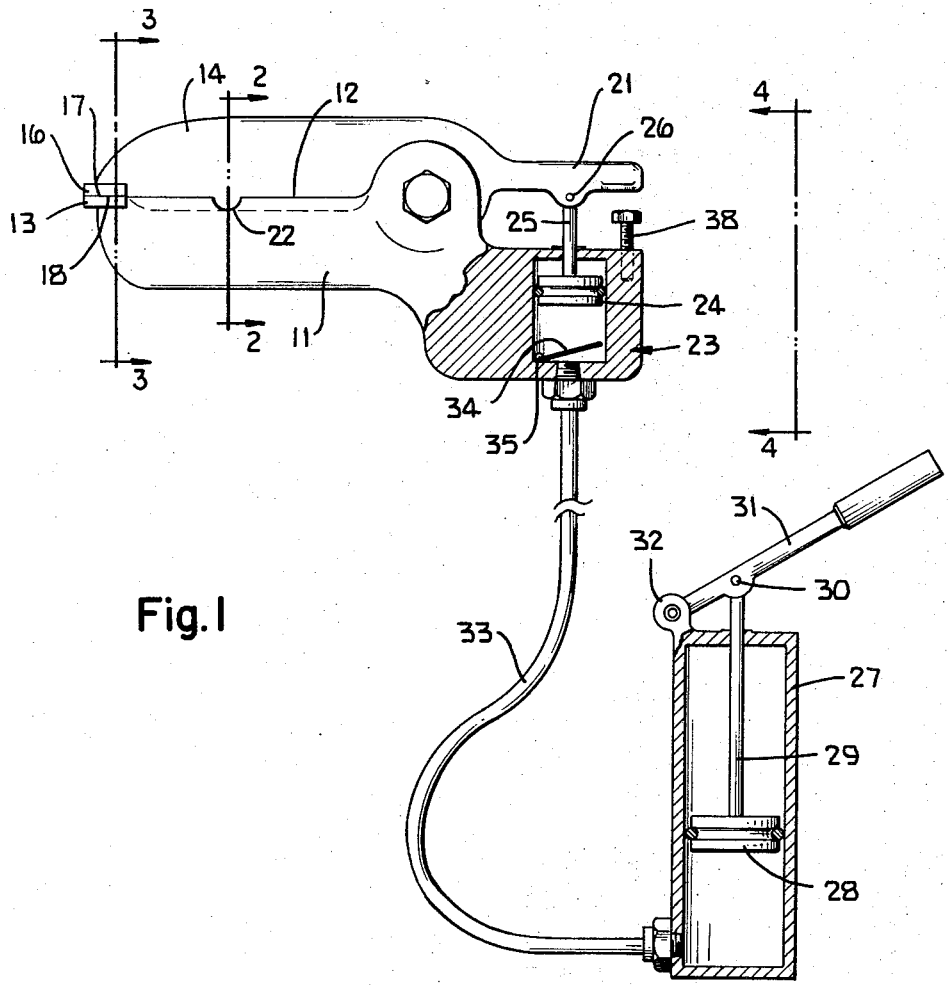
FIG. 1 is a fragmentary side view of a hydraulic cutter incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
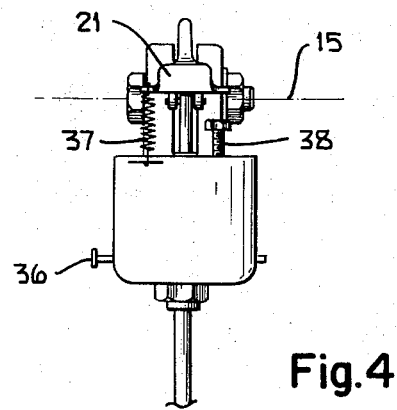
FIG. 4 is an end view looking in the direction of arrows 4—4 of FIG. 1.

Referring now more particularly to FIG. 1, there is shown a fluid operated tool for severing a strip and for crimping a seal on the strip. The tool includes a lower member 11 having an upper surface 12 and an outer distal end 13. A top blade 14 is hingedly mounted to member 11 about axis 15 (FIG. 4). Distal end 16 of blade 14 has a flat horizontal bottom surface 17 which mates with the flat horizontal top surface 18 of end 13 when the blade is in the closed position with respect to member 11.

Figure 2:
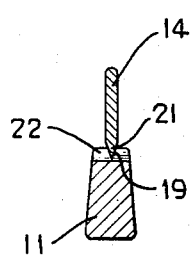
FIG. 2 is a cross sectional view taken along the line 2—2 of FIG. 1 and viewed in the direction of the arrow.

As shown in FIG. 2, member 11 is provided with a V-shaped groove 19 which extends from end 13 to end 20 of member 11. The V-shaped bottom cutting edge 21 of blade 14 is received by groove 19 when the tool is in the closed position. A second groove 22 extends across the top surface 12 of member 11 and is positioned perpendicularly with respect to groove 19. Groove 22 has a semi-circular cross section to receive a strip having a circular cross section. Blade 14 is pivoted upwardly about axis 15 with the strip to be cut then positioned in groove 22. The blade is then moved downwardly so as to sever the strip.

In the embodiment of the hydraulic cutter shown in FIGS. 1 through 4, a first hydraulic cylinder 23 shown fragmented is mounted fixedly to member 11. Cylinder 23 includes a vertically movable piston 24 with a piston rod 25 pivotally connected to pin 26 to rear portion 21 of blade 14. A second hydraulic cylinder 27 includes a vertically movable piston 28 having a piston rod 29 pivotally connected by pin 30 to pedal arm 31 pivotally mounted to flanges 32 of cylinder 27. A high pressure steel conduit 33 connects the interior of cylinder 27 to the interior of cylinder 23. Thus, by forcing pedal arm 31 downwardly, piston 28 is caused to move downwardly thereby applying fluid pressure through conduit 33 to cylinder 23. Flap valve 34 is pivotally mounted by rod 35 within cylinder 23 and when closed seals conduit 33 from cylinder 23. As the fluid pressure is applied through conduit 33, flap valve 34 will open thereby allowing the pressure to extend into the cylinder to force piston 24 and rear portion 21 of blade 14 upwardly thereby forcing the cutting edge of the blade into groove 19. As pressure is removed from pedal arm 31, the fluid will tend to flow in a reverse direction through conduit 33; however, flap valve 34 will immediately close thereby preventing the escape of fluid pressure from cylinder 23 until handle 36 is turned which is connected to rod 35.

If desired, a helical spring 37 (FIG. 4) may be mounted to and between rear portion 21 and member 11 so as to urge the rear portion towards cylinder 23 and cutting edge 21 from groove 19. Of course, handle 36 must first be rotated so as to open flap valve 34 before the spring will force the tool to the open position. A rod 38 is threadedly received by member 11 and is movable in a vertical direction so as to abut rear portion 21 thereby limiting pivotal motion of blade 14 and also limiting the distance which distal end 16 may move from distal end 13. On one embodiment, distal ends 13 and 16 would open a maximum of 7/16 of an inch. The spring is yieldable to allow for an application of fluid pressure for the closing of the tool.

Figure 3:
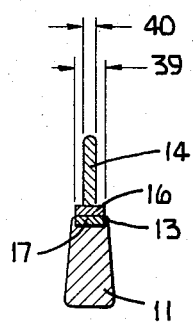
FIG. 3 is a cross sectional view taken along the line 3—3 of FIG. 1 and viewed in the direction of the arrow.

It is to be noted that rear portion 21 extends behind axis 15. Likewise, member 38 is adjustable and is mounted beneath rear portion 21. As shown in FIGS. 1 and 3, distal end 16 has a flat bottom surface 17 with a width 39 greater than the width 40 of cutting edge 19. The improvement of providing hydraulic means on the cutter while simultaneously providing the flat surface distal ends 13 and 16 allows the hydraulic means to force the flat bottom surface of distal end 16 against the top flat surface of distal end 13 so as to allow crimping of a seal of a steel strip. In addition, the cutting edge of blade 14 may be moved against member 11 so as to allow a steel strip to be severed.

Figure 5:
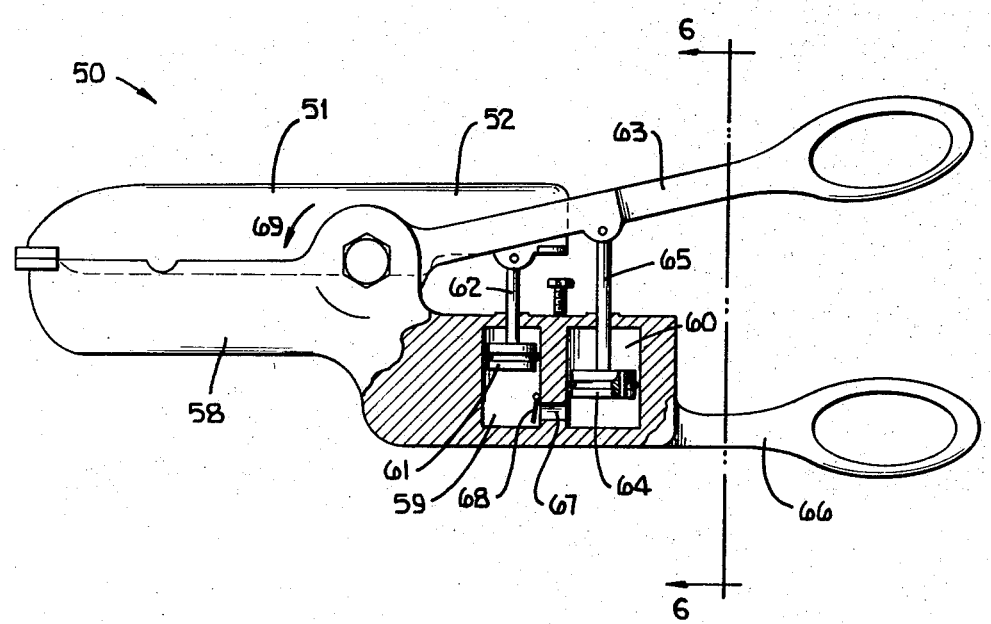
FIG. 5 is a fragmentary side view of an alternate embodiment of a hydraulic cutter incorporating the present invention.
Figure 6:
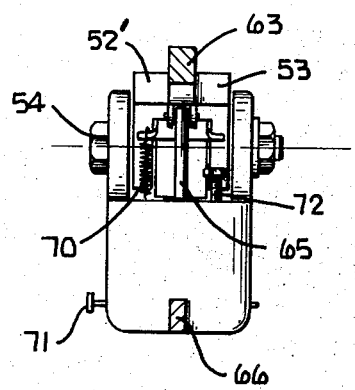
FIG. 6 is a cross sectional view taken along the line 6—6 of FIG. 5 and viewed in the direction of the arrows.

The alternate embodiment 50 of the hydraulic cutter is shown in FIGS. 5 and 6 and is identical with the cutter shown in FIGS. 1 through 4 with the exception that both hydraulic cylinders are mounted fixedly to the lower member of the cutter. Blade 51 has a rear portion 52 which is positioned inwardly of legs 52' and 53 of arm 63 pivotally mounted to lower member 58. Hydraulic cylinders 59 and 60 are shown in fragment in FIG. 5 and are connected together by passage 67. Hydraulic cylinder 59 has a piston 61 with a piston rod 62 pivotally connected to rear portion 52. The proximal end of arm 63 is pivotally mounted by bolt 54.

Hydraulic cylinder 60 has a piston 64 with a rod 65 pivotally connected to arm 63. Handle arm 66 is fixedly secured to lower member 58. Thus, by moving arm 63 downwardly, piston 64 is caused to move downwardly thereby applying fluid pressure through passage 67 thereby opening flap valve 68 and applying fluid pressure to the bottom surface of piston 61. Piston 61 is then caused to move upwardly thereby pivoting blade 51 in the direction of arrow 69. A helical spring 70 is connected to and between rear portion 52 and member 58 so as to pivot the blade in a direction reverse of arrow 69 when handle 71 is rotated thereby opening flap valve 68 in a manner identical to that described for flap valve 34. Likewise, a threaded member 72 is threadedly received by member 58 and is contactable with the rear portion 52 so as to limit the amount of pivotal motion of blade 51.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. In a fluid operated tool for severing a strip and for crimping a seal, said tool including a lower member having an upper surface and an outer distal end, a top blade hingedly mounted to said lower member and having a cutting edge and an outer distal end, means mounted to said top blade and said lower member operable to move said cutting edge against said top surface of said lower member wherein the improvement comprises:

said distal end of said lower member has a flat top surface and said distal end of said top blade has a flat bottom surface of greater width than said cutting edge, said means is operable to force said flat bottom surface against said flat top surface for crimping said seal and is operable to move said cutting edge against said upper surface for severing said strip; and said lower member has a longitudinally extending first groove which receives said cutting edge when said tool is in a closed position, said lower member has a second groove extending across said first groove, said second groove is sized to receive and hold said strip during severing of said strip.

2. The tool of claim 1 wherein:

said means includes a first hydraulic cylinder with a first piston connected to said blade and a second hydraulic cylinder in communication with said first cylinder, said means further includes a second piston movable within said second cylinder for application of fluid pressure to said first piston to close said blade on said lower member.

3. The tool of claim 2 wherein:

said blade has an axis of pivotal motion and a rear portion extending behind said axis, said member has an adjustable projection mounted thereon beneath said rear portion and is vertically movable to contact said rear portion to limit upward movement of said cutting edge with respect to said lower member.

4. The tool of claim 3 wherein:

said second groove has a semi-circular cross section whereas said first groove has a V-shaped cross section, said second groove extends perpendicularly to and across said first groove.

5. The tool of claim 4 wherein:

said first cylinder is mounted on said lower member, said first piston has a rod extending upwardly from said first cylinder and connected to said rear portion of said blade, said means further includes spring means connected between said rear portion and said lower member operable to normally urge said rear portion toward said lower member and said cutting edge upwardly from said lower member but yieldable to allow said first piston to move said rear portion upwardly from said lower member.

6. The tool of claim 5 wherein:

said second cylinder is mounted on said lower member and further comprising:

a first handle fixedly mounted to said lower member and a second handle pivotally mounted to said lower member at said axis, said second piston has a rod connected to said second handle, said second cylinder opens into said first cylinder with a valve mounted in said first cylinder to control flow of fluid.

7. The tool of claim 5 wherein:

said second cylinder is separate from said lower member and said blade but is connected to said first cylinder by a high pressure conduit, said second cylinder has a foot pedal mounted thereto with said second piston having a rod connected to said pedal.

8. The tool of claim 1 wherein:

said blade has an axis of pivotal motion and a rear portion extending behind said axis, said member has an adjustable projection mounted thereon beneath said rear portion and is vertically movable to contact said rear portion to limit upward movement of said cutting edge with respect to said lower member.

9. The tool of claim 1 wherein:

said second groove has a semi-circular cross section whereas said first groove has a V-shaped cross section, said second groove extends perpendicularly to and across said first groove.

10. The tool of claim 1 wherein:

said means includes a first hydraulic cylinder with a first piston connected to said blade and a second hydraulic cylinder in communication with said first cylinder, said means further includes a second piston movable within said second cylinder for application of fluid pressure to said first piston to close said blade on said lower member;

said blade has an axis of pivotal motion and a rear portion extending behind said axis, said member has an adjustable projection mounted thereon beneath said rear portion and is vertically movable to contact said rear portion to limit upward movement of said cutting edge with respect to said lower member; and said first cylinder is mounted on said lower member, said first piston has a rod extending upwardly from said first cylinder and connected to said rear portion of said blade, said means further includes spring means connected between said rear portion and said lower member operable to normally urge said rear portion toward said lower member and said cutting edge upwardly from said lower member but yieldable to allow said first piston to move said rear portion upwardly from said lower member.

* * * * *